Figure 1:
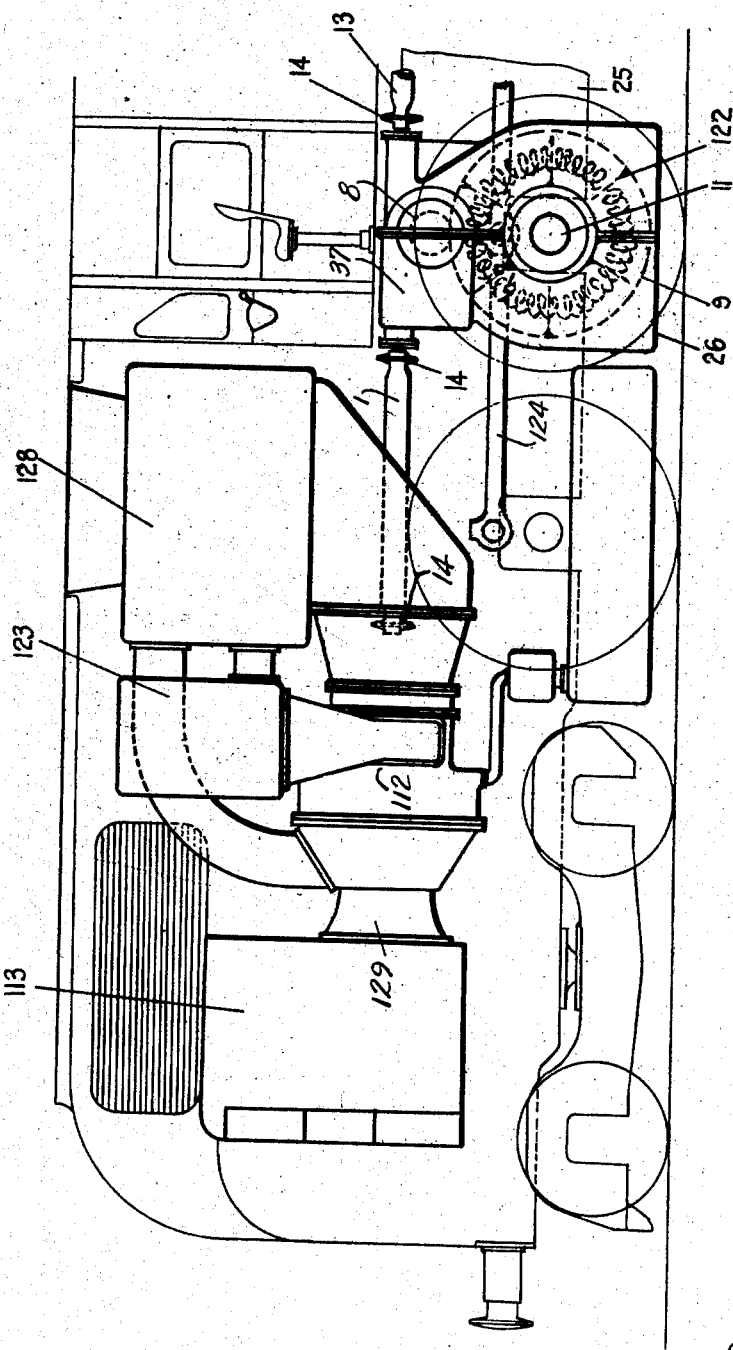

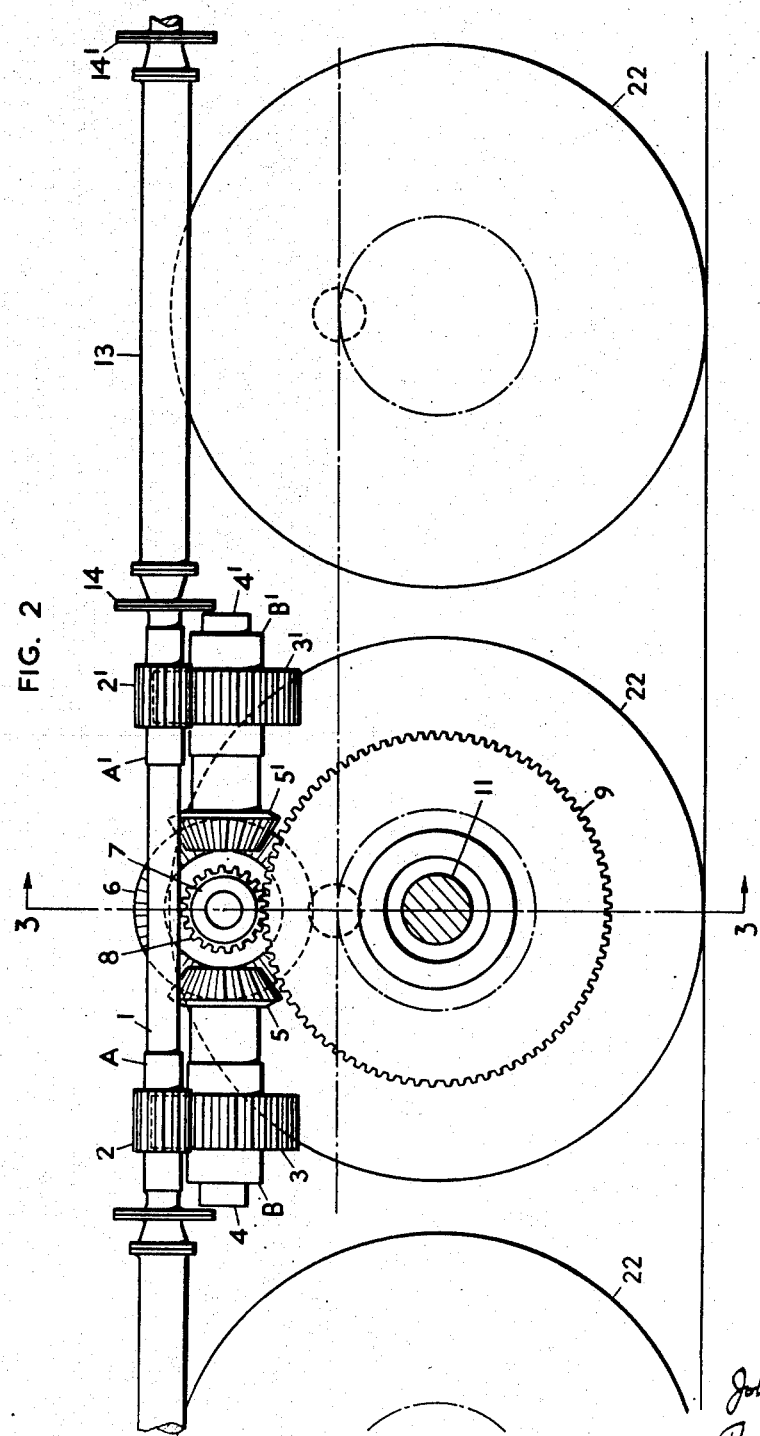

May 18, 1954  J. O. P. HUGHES  2,678,611
LOCOMOTIVE COMPRISING A TURBINE POWER
PLANT AND TRANSMISSION GEARING
Filed Oct. 14, 1948  3 Sheets-Sheet 3
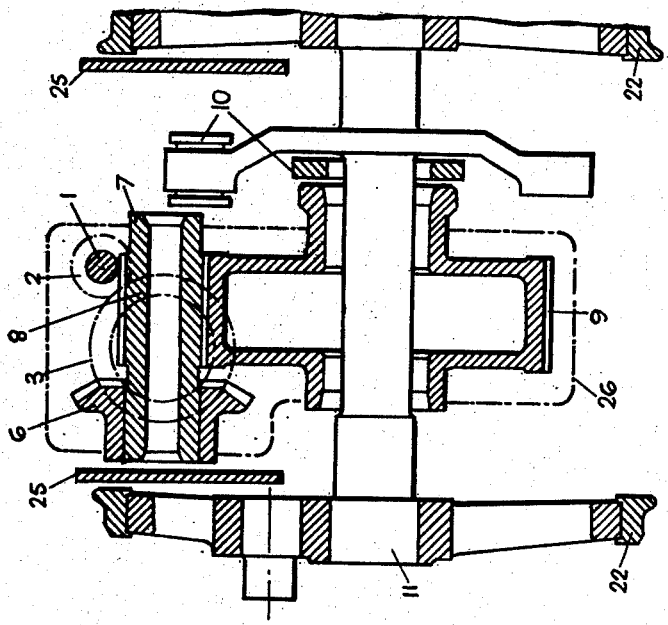
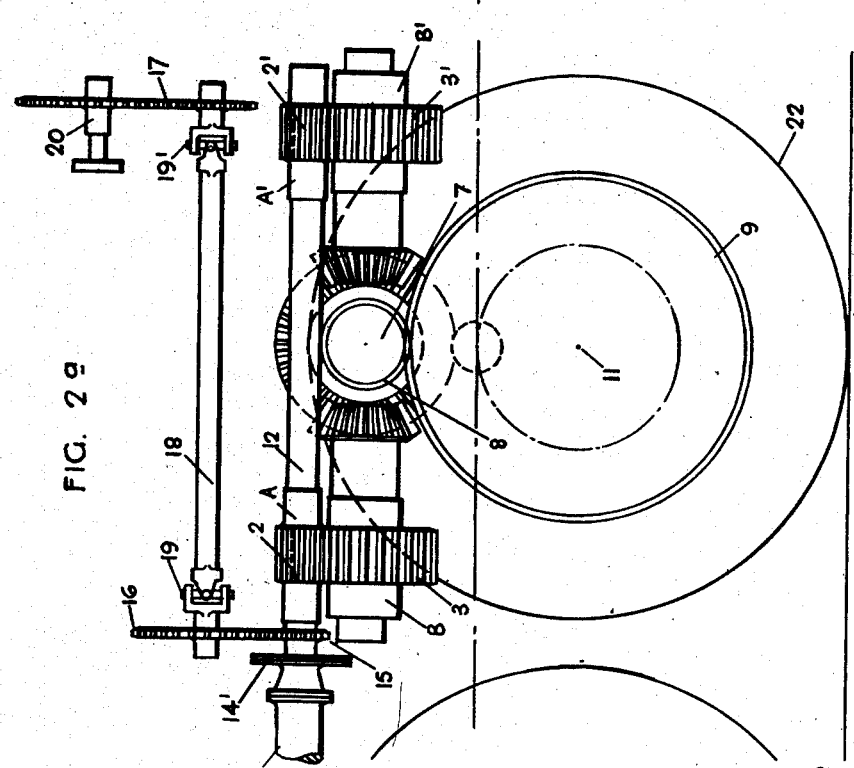
Inventor
John O. P. Hughes
By Babcock & Babcock
Attorneys Patented May 18, 1954

2,678,611

UNITED STATES PATENT OFFICE 2,678,611

LOCOMOTIVE COMPRISING A TURBINE POWER PLANT AND TRANSMISSION GEARING

John Oliver Philip Hughes, Rugby, England, assignor to The English Electric Company Limited, London, England, a British company Application October 14, 1948, Serial No. 54,463

Claims priority, application Great Britain October 29, 1947

5 Claims. (Cl. 105—118)

The invention relates to a locomotive having gearing of the kind in which an input shaft capable of revolving in one direction only and at high speed, is geared to an output shaft arranged at right angles to the input shaft and intended to be driven alternatively in either direction and at comparatively low speed. Gearing of this kind is suitable for example for a purely mechanical drive from a gas turbine to the wheels of the locomotive.

In such a gas turbine locomotive the space between the locomotive frames, i. e. transverse to the direction of the rails, is limited and it is an object of the invention to provide a gearing which can be usually accommodated between the main frames of the locomotive placed between the driving wheels.

According to a main feature of the invention the transmission gearing comprises an input shaft adapted to revolve in one direction only at a comparatively high speed, a pair of spur gear pinions arranged in alignment with one another and with the said input shaft, a pair of longitudinal lay shafts arranged in alignment with one another parallel to said input shaft, a pair of spur gear wheels each arranged co-axially with one of the said longitudinal lay shafts and in mesh with one of the said spur gear pinions, a pair of bevel gear pinions each co-axially arranged with one of the said longitudinal lay shafts, a pair of clutch means adapted to alternatively disconnect the said input shaft from the said bevel gear pinions and to connect it with either of them, a transverse lay shaft, a bevel gear attached to said transverse lay shaft and in mesh with both the said bevel gear pinions, a spur gear pinion attached to the said transverse lay shaft, and a big spur gear wheel in mesh with the spur gear pinion on the said transverse lay shaft and adapted to be driven at a comparatively low speed, forming the output member of the said transmission gears.

According to an embodiment of the invention, the gas turbine unit and the high speed input shaft driven by it are placed on the centre line of the locomotive while the centre line of the low speed gear is offset from the centre line of the locomotive and arranged side-by-side with the final drive to a driven locomotive axle.

According to a development of the invention, the high speed input shaft is continued to drive another gear unit of similar nature for the drive of another locomotive axle and/or to drive auxiliary units of the locomotive such as an electric generator, a compressor and/or exhaustor etc.

In order that the nature of the invention may be better understood, an embodiment of the invention will be described in what follows with reference to the accompanying drawings of which Fig. 1 shows a diagrammatic side elevation of a gas turbine driven locomotive according to the invention, Fig. 2 is a diagrammatic side elevation of a gear unit as mounted in a locomotive according to the invention, and Fig. 2a is a corresponding view of a similar gear unit arranged in alignment with that of Fig. 2 and adapted for the drive of locomotive auxiliaries, while Fig. 3 is a diagrammatic cross section on line 3—3 of Fig. 2.

Referring first to Fig. 1, a gas turbine set comprising an air filter 113, a compressor 129, a gas turbine rotor driving said compressor and another gas turbine rotor driving the shaft 1 disposed co-axially and in series flow arrangement, but mechanically independent from one another within the casing 112, a pair of combustion chambers 123, and a heat exchanger 128, is arranged with its axis on the vertical centre plane of the locomotive within the main frame 25. Shaft 1 is connected by resilient discs 14 both with the said gas turbine rotor and with the input member of a gearing 37 which is enclosed in the casing 26 and an extension shaft 13 may lead to a similar gearing (not shown).

Embodiments of the gearing 37 will be described later in detail. In Fig. 1 the last transmission stage only is indicated diagrammatically by the pinion 8 and big gear wheel 9, the latter being adapted to drive the locomotive axle 11 by means of a resilient coupling means 122. Side rods 124 are provided to drive the adjacent locomotive axles.

According to the embodiment of the invention as illustrated in Figs. 2, 2a and 3, the input shaft 1, which is intended to be driven by the gas turbine in one direction only at a comparatively high number of revolutions drives two spur gears 2 and 2' which mesh with two spur gear wheels 3 and 3' arranged in alignment with one another on longitudinal lay shafts 4 and 4' each of which carries a bevel pinion, 5 and 5' respectively. These bevel pinions mesh with the bevel wheel 6 arranged on the transverse lay shaft 7 carrying a spur gear pinion 8 (Fig. 3). This pinion meshes with the spur gear wheel 9 arranged co-axially with a main locomotive driving axle 11 and in torque connection with it through a radially resilient coupling 10. Clutches may be arranged on the lay shafts 4 and 4' respectively, at B and B' so as to couple alternatively the bevel pinions 5 and 5' with their respective spur gear wheel 3 and 3'. It will be clear from the diagram that this means reversing the drive of the output shaft 11 while maintaining the sense of rotation of the input shaft 1.

Alternatively, the clutches may be arranged at

A and A' for the connection of either spur gear pinion 2 or 2', to the input shaft 1. In neutral position the clutches at A, A' or B, B' are usually disengaged.

When the power to be transmitted is very large, it may be desirable to divide it among more than one such gear unit so that the power transmitted through one axle may be kept within a chosen maximum figure. This is achieved according to the invention by placing similar gear units on different axles, the requisite number of axles being coupled together by the well known device of cranks and side rods.

In order to avoid interference by the double coupling of said different axles on the one hand through the said gearing units, on the other hand through said side rods, torsionally resilient coupling means are arranged in the drive from the gearing units to the said coupled axles. In such a case the input shafts 1 (Fig. 2) and 12 (Fig. 2a) are coupled together by means of the propeller shaft 13 and the flexible couplings 14 and 14'. The second gear may differ from the first only in an additional spur gear train consisting of the spur gear pinion 15 driven by the input shaft 12, and meshing with the gear wheel 16. The gear wheel 16 drives the auxiliary gear train 17, through the propeller shaft 18 and the universal joints 19 and 19' of any well known type. This arrangement of auxiliary drive allows the main transmission gear units to be removed from the locomotive without disturbing the auxiliaries by uncoupling the universal joint 19. In a locomotive equipped with only one transmission gear unit the auxiliary drive may be arranged in alignment with shaft 1 and driven by shaft 13 through the flexible couplings 14 and 14'; in this case the auxiliary gear would incorporate a bigger speed reduction.

As will be seen from Fig. 3, each gear may be enclosed in a gear box 26 diagrammatically indicated in chain dotted lines, while the radially resilient torque coupling 10 which may be of the kind described in one of my copending Patent Applications No. 69,506, still pending, or No. 126,170, now Patent Number 2,554,739, issued May 29, 1951, is arranged outside said gear box so as to be readily accessible for servicing.

Both the gear box 26 and torque coupling 10 are arranged between the locomotive main frames 25 placed between the driving wheels 22.

While I have described and illustrated a preferred embodiment of my invention I wish it to be understood that I do not limit myself to the exact details and dimensions as described and illustrated, for obvious modifications will occur to a person skilled in the art.

What I claim as my invention and desire to secure by Letters Patent is:

1. A locomotive, comprising a turbine power plant having its centre line arranged on the vertical centre plane of the locomotive, a transmission gearing comprising an input shaft adapted to revolve in one direction only at a comparatively high speed, a pair of spur gear pinions arranged in alignment with one another and with the said input shaft, a pair of longitudinal lay shafts arranged in alignment with one another parallel to said input shaft, a pair of spur gear wheels each arranged co-axially with one of the said longitudinal lay shafts and in a direct mesh with one of the said spur gear pinions for driving both in the same direction, a pair of bevel gear pinions each co-axially arranged with one of the said longitudinal lay shafts, a pair of clutch means adapted to alternatively disconnect the said input shaft from the said bevel gear pinions and to connect it with either of them, a transverse lay shaft, a bevel gear attached to said transverse lay shaft and in mesh with both the said bevel gear pinions, a spur gear pinion attached to the said transverse lay shaft, and a big spur gear wheel in mesh with the spur gear pinion on the said transverse lay shaft and adapted to be driven at a comparatively low speed, forming the output member of the said transmission gears, the two longitudinal lay shafts, the transverse lay shaft and the output member all being arranged asymmetrically to the vertical centre plane of the locomotive, a radially resilient torque coupling, and a driven locomotive axle, the said radially resilient torque coupling being arranged laterally to and co-axially with the said output member on the said driven locomotive axle in operative driving connection therewith.

2. A locomotive as claimed in claim 1 comprising a protective casing enclosing the said transmission gearing, the said radially resilient torque coupling being arranged outside the said casing.

3. A locomotive as claimed in claim 1 comprising an additional transmission gearing, a driving shaft connecting said additional transmission gearing with the input member of the first transmission gearing, and another driven locomotive axle in operative driving connection with the output member of the said additional transmission gearing.

4. A locomotive as claimed in claim 3 comprising side rod drives adapted to couple the said driven locomotive axles, and torsionally resilient coupling means operatively arranged between at least one of the said transmission gearings and its associated driven locomotive axle.

5. A locomotive as claimed in claim 3 comprising, in addition, locomotive accessories including an air pump for the locomotive brakes and an electric generator, and a reduction gearing adapted to be driven by the input member of one of the said transmission gearings and to drive the said locomotive accessories at a reduced speed.

References Cited in the file of this patent

UNITED STATES PATENTS

| Number | Name | Date |
|---|---|---|
| 567,560 | Bagnell | Sept. 8, 1896 |
| 873,442 | Levin | Dec. 10, 1907 |
| 1,215,581 | Rutherford | Feb. 13, 1917 |
| 1,984,958 | Barske | Dec. 18, 1934 |
| 2,034,778 | Storey | Mar. 24, 1936 |
| 2,118,814 | Holzwarth | May 31, 1938 |
| 2,140,967 | Nyffenegger | Dec. 20, 1938 |
| 2,142,266 | Drachenberg | Jan. 3, 1939 |
| 2,171,715 | Sinclair | Sept. 5, 1939 |
| 2,424,543 | Alben | July 29, 1947 |
| 2,424,676 | Alben | July 29, 1947 |

FOREIGN PATENTS

| Number | Country | Date |
|---|---|---|
| 733,013 | France | Sept. 29, 1932 |
| 779,250 | France | Apr. 1, 1935 |
| 309,412 | Germany | Nov. 25, 1918 |
| 190,193 | Great Britain | Dec. 18, 1922 |
| 253,297 | Great Britain | June 17, 1926 |
| 55,694 | Netherlands | Dec. 15, 1943 |
| 107,419 | Sweden | May 18, 1943 |